July 24, 1923.
I. C. WOODWARD
CLUTCH FOR DIFFERENTIAL GEAR CONTROL MECHANISM
Filed Oct. 22, 1921
1,462,879
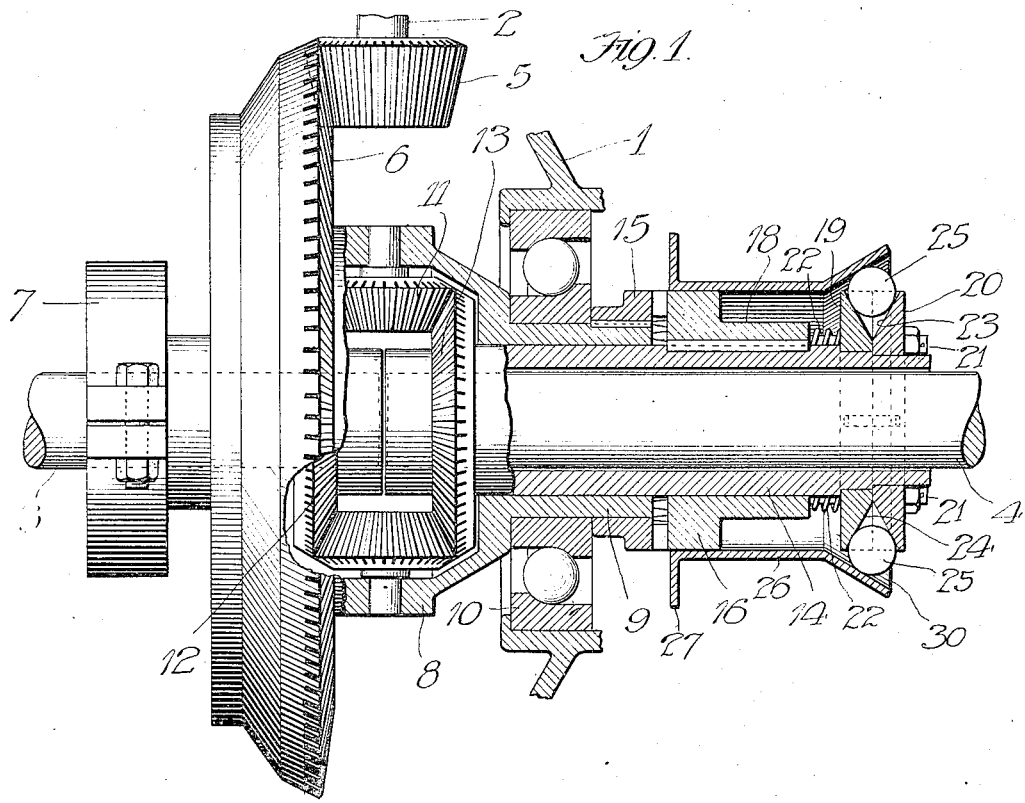
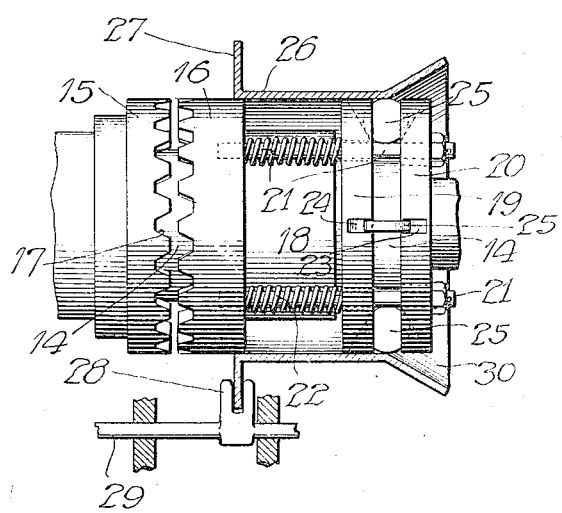
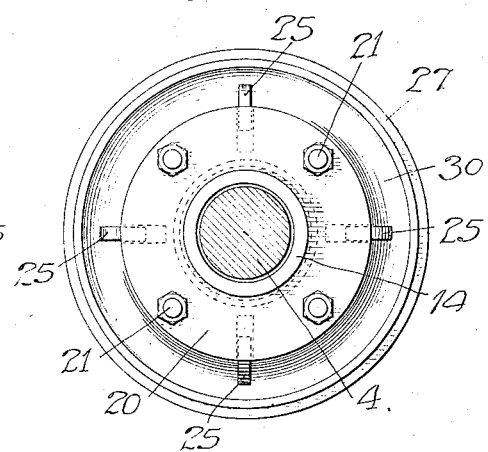

Patented July 24, 1923.

1,462,879

UNITED STATES PATENT OFFICE.

IRVING C. WOODWARD, OF SYRACUSE, NEW YORK.

CLUTCH FOR DIFFERENTIAL-GEAR-CONTROL MECHANISM.

Application filed October 22, 1921. Serial No. 509,660.

*To all whom it may concern:*

Be it known that I, IRVING C. WOODWARD, a citizen of the United States of America, and a resident of Syracuse, county of Onondaga, and State of New York, have invented a new and useful Improvement in Clutches for Differential-Gear-Control Mechanism, of which the following is a specification.

This invention relates to clutch devices for controlling or limiting differential action in differential gears at times when it is desirable to resist differential action, and particularly to operating mechanisms for controlling such clutch devices.

In the form shown, the improved operating mechanism is applied to a differential gear control clutch which may be thrown in or out of action at the will of the operator according to circumstances, and which will permit unrestrained differential action under normal conditions, and permit of restraining the differential action so as to insure that a predetermined amount of tractive power may be delivered to each driven wheel regardless of the condition of the roadway or the fluctuation of the tractive load on the wheels.

An illustrative embodiment of this invention is shown in the accompanying drawings, in which—

Fig. 1 is a sectional plan view of a differential gearing constructed according to this invention.

Fig. 2 is a side elevation partly in section, of the clutch mechanism.

Fig. 3 is an end view of the clutch mechanism taken from the right of Fig. 2.

In its general design the present construction is similar in principle to that disclosed in my Patent No. 1,355,297, issued October 12, 1920. Both designs as illustrated in the patent and this application include means for imposing resistance to normal differential action.

The invention disclosed in my said patent resides in utilizing a friction clutch to interpose resistance to the differential action when such resistance is desirable. The present invention relates to a specific improved operating mechanism for such clutch. This operating mechanism includes wedging rollers or disks for moving one clutch member away from the other against spring resistance.

In the form shown, the differential gearing comprises the usual frame structure or housing 1, power shaft 2, and driven shafts 3 and 4. The power shaft 2 has a pinion 5, which meshes with a gear 6 loosely journaled concentric with the shaft 3 in a bearing 7 formed in the housing 1. A spider or housing 8 for the planetary gears is secured to the gear 6 by bolts (not shown) and has a hub 9 which is in turn journaled concentric with the shaft 4 in a ball bearing 10 of the housing 1. A plurality of planetary gears 11 are journaled on stud shafts carried by the housing 8, and mesh with beveled gears 12 and 13. The beveled gear 12 is fixed on the shaft 3, and the gear 13 is fast on a sleeve 14, which is keyed or otherwise secured at its inner end to the driven shaft 4 so as to rotate therewith.

The present invention resides in the means for controlling the action of the differential gearing, and in the particular form illustrated comprises a clutch interposed between the planetary gear housing 8 and the shaft 4, it being understood that the locking of the shaft 4 to the housing 8 has the effect of locking the entire differential gearing, thereby compelling both shafts 3 and 4 to rotate as a unit.

The clutch mechanism comprises a pair of concentric clutch elements 15 and 16, having interfitting projections or shoulders 17 on their opposed faces, and the abutting side faces of the shoulders 17 are inclined as shown in my Patent No. 1,355,297, issued October 12, 1920. The element 15 is mounted on the outer end of the hub 9 and is keyed thereto so as to be axially stationary and to rotate with the planetary gear housing 8. The clutch element 16 has a hub 18, and is splined on the sleeve 14 as shown in Fig. 1 to rotate with the sleeve but to be movable axially thereon.

Mounted on the outer end of the sleeve 14 is a pair of axially disposed rotatable members 19 and 20, arranged with their opposed faces in abutting relation. The member 19 is fixed on the sleeve 14 in spaced relation to the hub 18, and the member 20 is loosely mounted on the sleeve so as to be axially shiftable with respect to the sleeve and member 19. The member 20 is connected to the clutch element 16 by rods 21 which extend through openings in the axially stationary member 19, so that the clutch element 16 and members 19 and 20 rotate as a unit with the sleeve 14. Springs 22 embrace the rods 21 and bear between the clutch element 16 and member 19 for normally urging the clutch element 16 into engagement with the element 15 to lock the driven shafts 3 and 4 against differential operation. The springs 22 also normally hold the member 20 in abutting relation with the axially stationary member 19. Extending inwardly from the peripheries of the members 19 and 20 is a plurality of radially disposed recesses or slots 23, arranged in opposed relation and having inclined cam surfaces 24. Seated in the slots 23 are wedges in the form of disks 25 which are arranged to coact with the cam surfaces for driving the member 20 axially away from the member 19, thereby disengaging the clutch elements.

Loosely supported on the periphery of the clutch element 16 is an axially movable cylindrical actuator 26, having an annular flange 27 formed on its inner end for engagement with the fork 28, of a shifting rod 29. The outer end of the actuator is formed to provide a frusto-conical bearing surface 30, which rides upon the peripheries of the disks 25 so that the axially outward movement of the actuator will cause the disks to move radially inward to separate the members 19 and 20.

When the clutch elements 15 and 16 are engaged, the shaft 4 is locked to the housing 8 whereby both of the driven shafts will be rotated in unison. The abutting faces of the shoulders 17 of the clutch elements are disposed at such an angle that when a certain predetermined torsional strain is exceeded, the clutch elements may be wedged apart, and differential movement of the driven shafts may take place as described in my above mentioned copending patent.

The rod 29 may be actuated and locked so as to hold the clutch open by any of the usual forms of lever and toggle mechanism such as are used on the brakes of automobiles.

The operation of the device shown is as follows:

When the clutch is open, the power is transmitted as usual so that the driven shafts will each receive an equal amount of power when the tractive resistance of the vehicle wheels is equal. When the vehicle is driven in a curve, the wheel traversing the path of lesser radius slows down accordingly, while the wheel traversing the path of greater radius increases its speed as usual.

When, however, the pavement is slippery or the vehicle is on a steep grade or when the road is rough so that the vehicle wheels are sometimes lifted clear of the road, the operator may prevent skidding, racing of the engine, loss of traction, and other troubles inherent in the usual differential gearing by throwing in the gear locking clutch, and thereby preventing free differential action. If then, due to road conditions or the manner of operating the vehicle, one of the driven wheels loses its tractional hold on the road, the clutch will insure an amount of power, up to the limit of the holding power of the clutch, to be positively delivered to both driven shafts. If the circumstances are such that the strain on the clutch is sufficient to overcome the holding power of the inclined clutch, shoulder faces and springs, then the clutch elements will be forced apart against the springs, and differential action will take place thus preventing excessive strain upon the gearing.

Although but one specific embodiment of this invention has been herein shown and described, it will be understood that numerous details of the construction shown may be altered or omitted without departing from the spirit of this invention as defined by the following claims.

I claim:

1. The combination of a clutch operating mechanism, with a clutch comprising a pair of elements having coacting shoulders on their opposed faces, yielding means normally holding said elements in driving relation to each other, a pair of rotatable members having opposed cam surfaces, one of said rotatable members being axially stationary, the other of said rotatable members being axially movable and connected to one of said clutch elements by rods extending through said one member, and wedging means coacting with said cam surfaces for moving said other member away from said one member to disengage said clutch elements.

2. The combination of a clutch operating mechanism, with a clutch comprising a pair of elements having coacting shoulders on their opposed faces, yielding means normally holding said elements in driving relation to each other, a pair of axially arranged rotatable members, one of said members being axially stationary, the other of said rotatable members being axially movable and connected to one of said clutch elements by rods extending through said one member, said yielding means embracing said rods and bearing between said one clutch element and axially stationary member, said rotatable members having radially disposed recesses extending inwardly from the peripheries thereof and arranged to form inclined cam surfaces, disks seated in said recesses and coacting with said cam surfaces, and an actuator axially arranged with respect to said rotatable members and having a frusto-conical bearing surface arranged to move said disks inwardly by the axial movement of said actuator for moving said other member away from said one member to disengage said clutch elements.

Signed at Syracuse this 15 day of Oct. 1921.

IRVING C. WOODWARD.